United States Patent [19]

Schmidt, Jr. et al.

[11] 4,084,773
[45] Apr. 18, 1978

[54] MAGNETIC CONTROL OF SPACECRAFT ROLL DISTURBANCE TORQUES

[75] Inventors: George Edwin Schmidt, Jr., Delran; Ludwig Muhlfelder, Livingston, both of N.J.

[73] Assignee: RCA Corporation, New York, N.Y.

[21] Appl. No.: 751,866

[22] Filed: Dec. 17, 1976

Related U.S. Application Data

[63] Continuation of Ser. No. 613,094, Sep. 15, 1975, abandoned.

[51] Int. Cl.² .......................... G06F 15/50; B64G 1/10
[52] U.S. Cl. ...................................... 244/166; 364/434
[58] Field of Search .................. 235/150.2, 150.25; 244/3.21, 166

[56] References Cited

U.S. PATENT DOCUMENTS 3,489,372  1/1970  Ellis et al. ........................ 244/166
3,681,583  8/1972  Kubo et al. ..................... 244/166 X Primary Examiner—Stephen G. Kunin
Attorney, Agent, or Firm—Edward J. Norton; H. Christoffersen; Joseph D. Lazar

[57] ABSTRACT

For a spacecraft in an equatorial or low inclination orbit predictable roll disturbance torques due principally to solar radiation pressure are minimized by interacting a magnetic dipole oriented parallel to the spacecraft's yaw axis with the earth's magnetic field. Signals either from an on board sun sensor or from an earth station are utilized by the satellite mounted magnetic switching and driver circuit to control the compensating torques.

15 Claims, 7 Drawing Figures

MAGNETIC CONTROL OF SPACECRAFT ROLL DISTURBANCE TORQUES

This is a continuation, of application Ser. No. 613,094, filed 9/15/75 now abandoned.

BACKGROUND OF THE INVENTION

1. Field of the Invention

This invention relates to torque compensation for pitch momentum biased satellites in equatorial or low inclination orbits and more particularly for the compensation of constant or very slowly varying roll disturbance torques by magnetic torquing in an open loop system.

2. Description of the Prior Art

A stabilized orbiting satellite requires a means for changing its attitude when it has deviated from its desired orientation or position relative to its orbit.

Magnetic torquing of dual-spin stabilized satellites is known. Such magnetic torquing systems use a magnetic field from torquers such as coils or electromagnets to interact with the magnetic field of the earth to develop a reaction torque. This reaction torque causes the reference axis of the satellite to be repositioned an amount proportional to the torquing time and flux magnitude as is well known in the art.

A closed loop system for controlling roll and yaw error in an orbiting pitch momentum biased satellite is described in U.S. Pat. No. 3,834,653 issued Sept. 10, 1974, to RCA Corporation, based on the invention of Harold Perkel entitled "Closed Loop Roll and Yaw Control for Satellites." The system described therein achieves control by using the errors in roll as the control input parameter of the closed-loop system. A magnetic dipole oriented along the roll axis for a satellite in a synchronous low inclination orbit interacts with the primary magnetic field which is perpendicular to the orbit plane to produce a magnetic control torque about the yaw axis. Attitude sensors in combination with electronic logic energize the dipole with currents of appropriate polarity and magnitude to effect the necessary torque, to correct the satellite's attitude. Because of gyroscopic cross-coupling between the roll and yaw axes, the control torque causes precession about the roll axis which cancels out the roll errors. Thus, the magnetic torquer directly reduces the roll error and indirectly controls the yaw error.

As is well known in the art for such an earth oriented spacecraft, yaw errors are not sensible by earth sensors. Further, roll and yaw errors interchange sinusoidally on approximately a quarter orbit basis throughout the orbit for such a momentum biased spacecraft because of the inertial stiffness of the momentum vector. Thus, in the closed loop system described in the above patent, satellite motion resulting from constant or slowly varying roll disturbance torques will be compensated after a quarter orbit, when the resulting yaw motion has coupled into roll. This quarter orbit lag in achieving correction of roll disturbance torques may result in unacceptably large yaw errors.

For a spacecraft in either an equatorial orbit, such as a synchronous communication satellite, or a low inclination orbit, the principal cause of constant or very slowly varying roll disturbance torques is solar radiation pressure on the spacecraft's solar array or antenna farm. Roll disturbance torques can also result from other factors such as the gravity gradient or residual spacecraft magnetic dipoles.

Accordingly, a system for directly compensating for predicted slowly varying roll disturbance torques is needed to overcome the deficiencies of the presently known system.

SUMMARY OF THE INVENTION

According to the present invention, a spacecraft control system includes a magnetic torquing means which is energized with currents of appropriate polarity and magnitude to effect the necessary torque to minimize and therefore compensate for roll disturbance torques. The torquing means is oriented in the spacecraft so as to develop a magnetic dipole substantially parallel to the yaw axis. Command signals which represent the declination of the sun are transmitted to the spacecraft from an earth station. These signals are received and processed by receiver means. An energizing means is suitably arranged to generate in response to the processed command signal from the receiver means a signal determining appropriate current magnitude and polarity for the magnetic torquer.

DESCRIPTION OF THE PREFERRED EMBODIMENT

Figure 1:
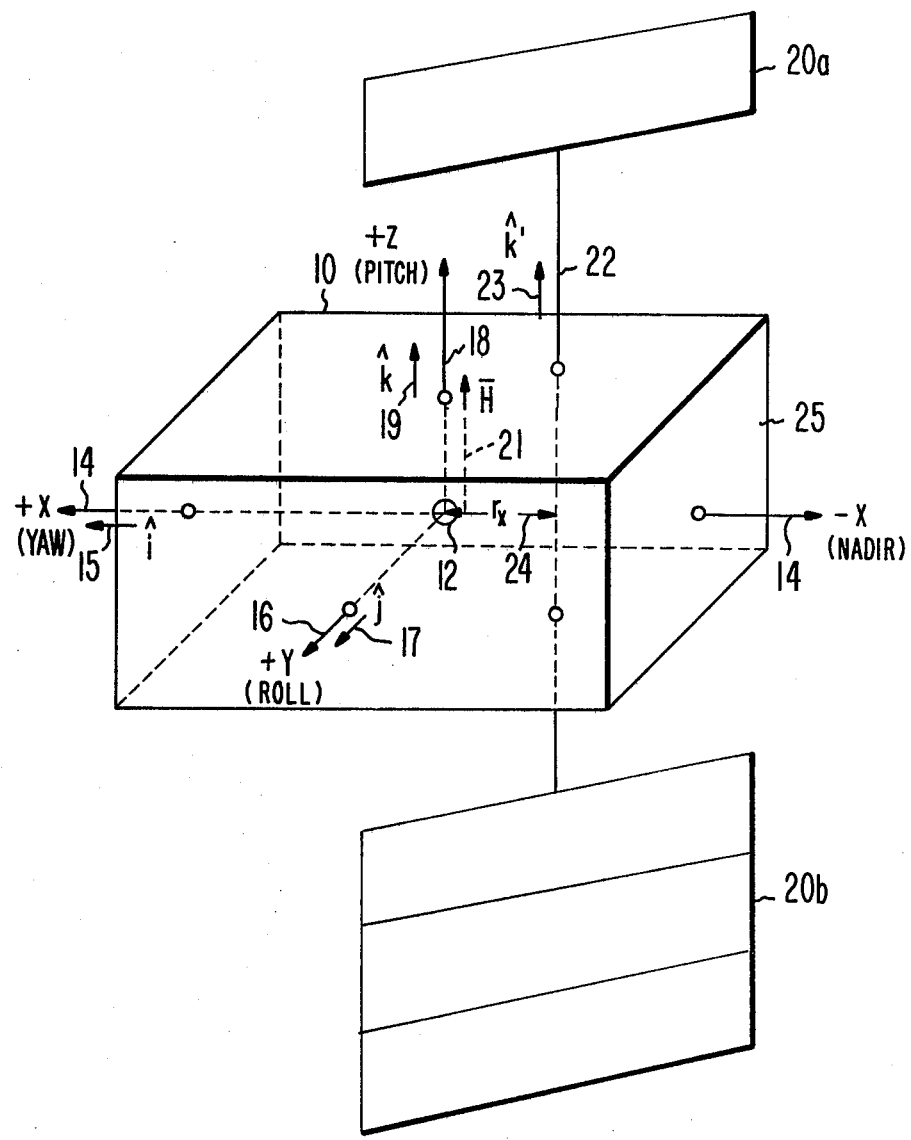
FIG. 1 is a schematic diagram of a satellite showing the three axes thereof as related to the momentum and velocity vectors.

Referring to FIG. 1, there is shown a body 10 which may be a satellite or spacecraft of any suitable or desired shape. Extending from the center of mass 12 are three mutually perpendicular axes X, Y, and Z designated as 14, 16, 18, corresponding to conventionally designated yaw, roll, and pitch axes respectively. Also shown are three unit vectors $\hat{i}, \hat{j},$ and $\hat{k},$ designated as 15, 17, 19. Each unit vector is associated with one of the spacecraft's three axes, where 15 is the unit vector along the yaw axis 14, 17 is the unit vector along the roll axis 16, and 19 is the unit vector along the pitch axis 18.

Figure 6:
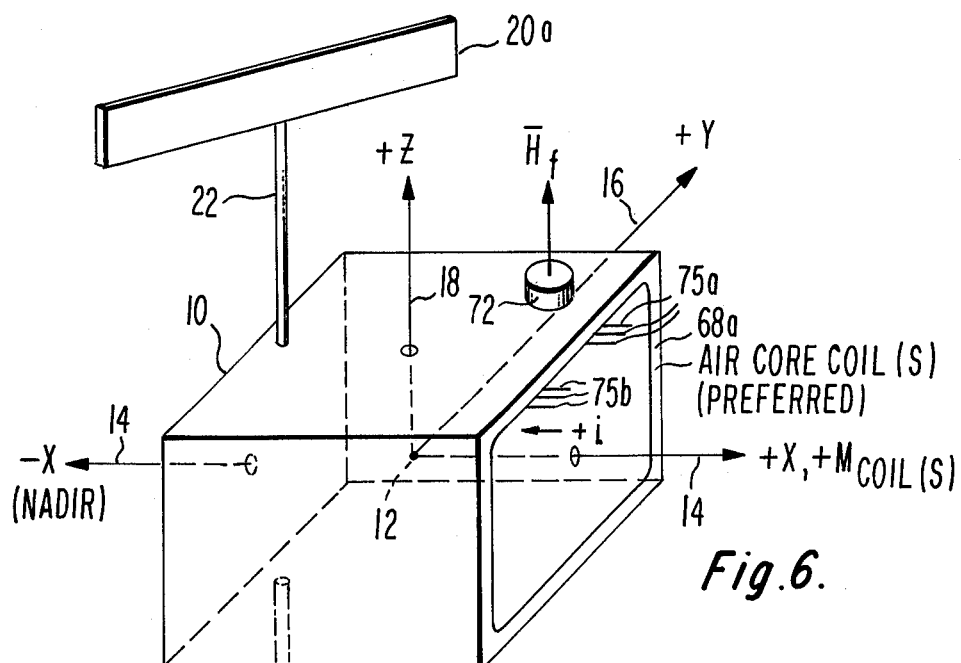
FIG. 6 is a schematic diagram of the satellite of FIG. 1 showing the momentum wheel and the preferred and alternative forms of the magnetic torquer.

The pitch (Z) axis 18 is defined to be that direction in the spacecraft 10 collinear with the total angular momentum vector $\overline{H}$ designated as 21 and the normal to the orbit plane when the spacecraft 10 is operating in its intended mission orientation. The pitch axis 18 is parallel to the axis about which a momentum wheel, shown in FIG. 6, is rotated. The sign convention is that the pitch axis 18, shown in FIG. 1, is positive and is in the positive direction of the angular momentum vector 21. Thus, according to the usual convention in this art, the angular momentum possessed by the spacecraft 10 is equivalent to having the body 10 spinning counter clockwise about the pitch axis. The yaw and roll axes 14, 16 are mutually perpendicular and orthogonal to the pitch axis. The axis system as defined and used herein according to the usual convention is right handed in the order X-Y-Z. The Z axis 18 shall at all times be referred to herein as the pitch or spin axis. The Z axis is parallel to the axis of the spinning (momentum) wheel (not shown).

The pitch axis 18 of spacecraft 10 is also parallel to the axis 22 on which a solar array 20a, 20b is mounted. Unit vector $\hat{k}'$ designated as 23 is associated with axis 22. It is seen that the solar array 20a, 20b is asymmetrical about the spacecraft's center of mass 12 and that the axis 22 on which the array is mounted is displaced in the X, Y, and Z directions from the center of mass 12. The solar array as shown is asymmetrical, but it can also be either symmetrical or have only a top panel such as 20a or a bottom panel such as 20b.

For a spacecraft is either an equatorial orbit, such as a synchronous communication satellite or a low inclination orbit, the principal cause of constant or very slowly varying badly fixed roll disturbance torques is solar radiation pressure on the spacecraft's surface such as the solar array 20a, 20b, or antenna farm not shown. The antenna farm is typically mounted on the side 25 of spacecraft 10 which faces the earth. The −X axis designated as 14 represents the nadir which is the point on the earth directly below the satellite. Roll disturbance torques can also result from other factors such as the gravity gradient or residual spacecraft magnetic dipoles. For a synchronous altitude communication satellite the roll disturbance torque due to the gravity gradient is negligible. Roll disturbance torques due to spacecraft residual magnetic dipoles are also nominal when compared to the disturbance torques due to solar radiation pressure.

The solar energy of the sun causes pressure to be applied on all exposed surfaces of the satellite. The torque exerted on the spacecraft due to the solar radiation pressure is proportional to the properties of the particular surface, the radiation pressure, the displacement of the center of pressure of the surface with respect to the spacecraft's center of mass 12, and the angle that the sun makes with respect to a unit normal to the surface. As seen in FIG. 1, the shaft 22 of the solar array and therefore the centers of pressure of the array 20a and 20b, are displaced from the center of mass in the X direction by the distance $r_x$ which is designated 24. The array 20a and 20b centers of pressure are also displaced from the Y and Z axes respectively by $r_Y$ and $r_Z$ which are not shown but readily apparent.

As a result of the array 20a and 20b, displacements $r_X$, $r_Y$, $r_Z$ from the spacecraft's center of mass 12, solar pressure disturbance torques occur. These torques can be resolved into components along the yaw, roll and pitch axes. The $r_Z$ array displacements result in a solar disturbance torque which is parallel to the plane of the arrays and normal to the array shaft. A system for compensating for such a disturbance torque normal to a solar array is described in U.S. Pat. No. 3,838,834, issued Oct. 1, 1974, to RCA Corporation, based on the invention of Theodore D. Michaelis entitled "Solar Torque Compensation for a Satellite."

The $r_X$ and $r_Y$ array center of pressure displacements, in combination with array asymmetries can cause a solar disturbance torque which is parallel to the Z axis. The Z axis disturbance torque produces a pitch error which can be sensed by an earth sensor and removed by momentum transfer between the spacecraft body and the momentum wheel.

The $r_Y$ displacement will also result in a solar disturbance torque which is collinear with the X axis and, according to gyroscopic laws, produce a roll error. This error can then be compensated by the system described in the aforementioned Perkel patent.

The $r_X$ displacement will also result in a solar disturbance torque which is collinear with the Y axis and according to gyroscopic laws, produce a yaw error which cannot be sensed by an earth sensor. The yaw error can grow unacceptably large even though it is indirectly controlled by the techniques described in the aforementioned Perkel patent. The yaw error is defined as the angle between the angular momentum vector ($\overline{H}$) 21 of FIG. 1 and the plane formed by the yaw axis and the orbit normal where the orbit normal is a vector which indicates the direction perpendicular to the orbit plane.

According to the present invention, open loop compensation of such a predicted body fixed roll axis disturbance torque is provided. Thus, yaw errors caused by constant or slowly varying roll torques are compensated for by a magnetic torque equal and opposite to the roll disturbance torque, the magnetic torque being developed by a magnetic flux from a coil mounted on the spacecraft such that the plane of the coil is substantially normal to the yaw axis reacting with the magnetic field of the earth. A satellite in orbit about the earth is immersed in the earth's magnetic field which extends, generally, from the south to the north pole of the earth. Satellites that are orbiting at synchronous altitudes are generally in a position that is relatively fixed with respect to the earth's surface at a substantially unvarying altitude. The magnetic field of the earth at such synchronous altitudes is nominally a constant. Although the earth's magnetic field is, in general, favorably oriented, a satellite utilizing magnetic torquing means to react with the earth's magnetic field may be provided with means to sense changes in the earth's magnetic field due to solar substorm effects in order to effect the desired torques by electromagnetic torquing techniques. In general, according to the present invention, the magnetic field of the earth is utilized by reacting it with the electromagnetic field of a coil mounted on the spacecraft to produce a dipole substantially parallel to the yaw axis to develop a torque needed to compensate for predicted constant or slowly varying roll torques.

Figure 2:
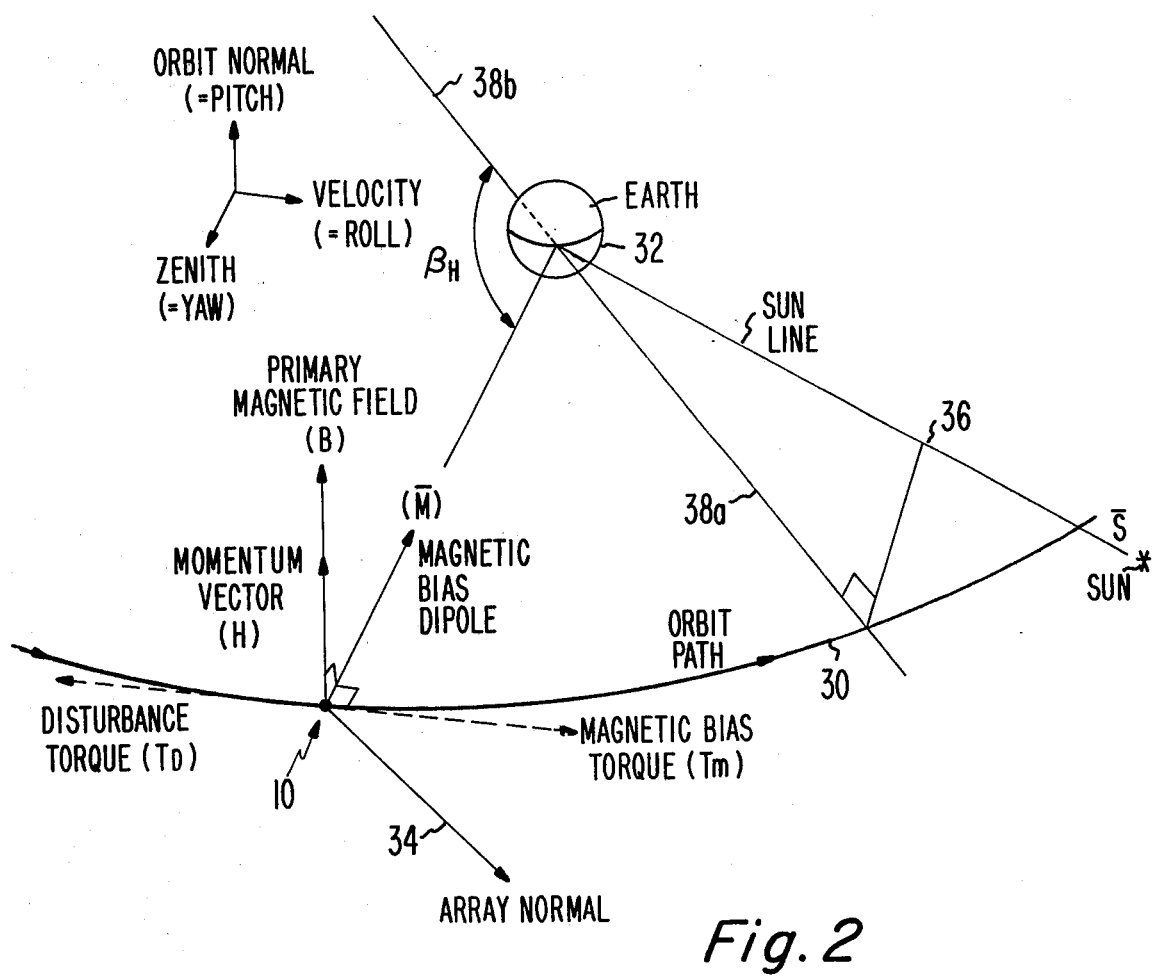
FIG. 2 is a diagram showing the vector relationships concerned with the mechanical controls relating to the invention.

The diagram illustrated in FIG. 2 shows in another form the vector relationships of the various forces and torques that are of concern to a satellite using the invention. The diagram illustrates the satellite 10 in a synchronous altitude orbit 30 about the earth 32 at a time when the sun is oriented as shown. The orbit is approximately equatorial. The solar panel of the satellite is oriented, as represented by the array normal 34, to face at this time towards the sun parallel to the projection of the sun line vector 38a and 38b in the orbit plane. The disturbance torque $T_d$ introduced along the roll axis principally as a result of the displacement of the solar array from the center of mass of the spacecraft is compensated for by the magnetic bias torque $T_m$ which is generated by the interaction of the magnetic dipole M mounted along the yaw axis with the earth's magnetic field B. The earth's magnetic field for a satellite at synchronous altitude is sufficiently constant and parallel to the orbit normal. The projection of the sun line 36 in the orbit plane is represented by the line formed by portions 38a, and 38b. The angle $\beta_H$ is the orbit angle measured relative to the projection 38a, and 38b of the sunline in the orbit plane. The projection line 38b represents an orbit angle of zero degrees whereas the projection line 38a represents an orbit angle of 180°.

Figure 3:
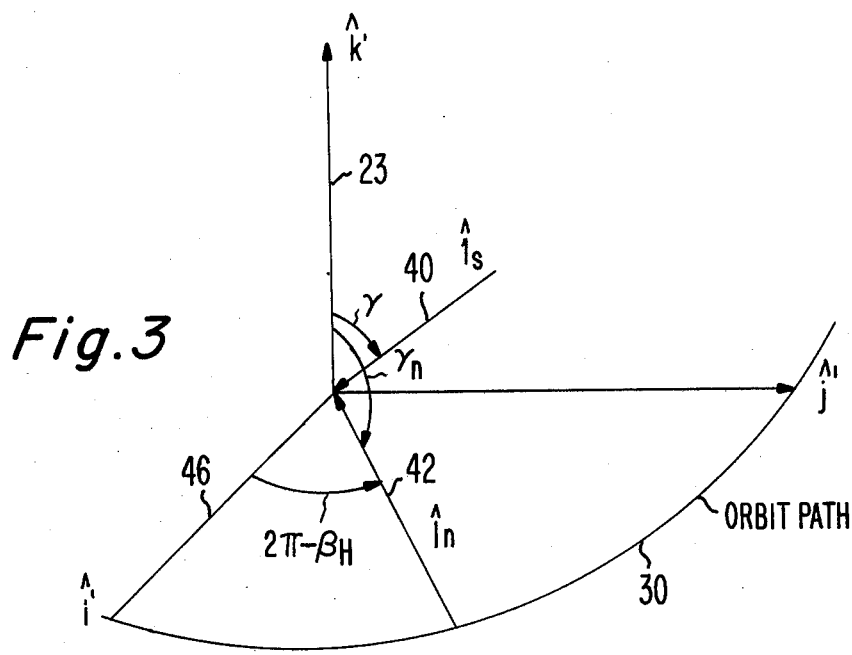
FIG. 3 is a diagram showing the vector relationships between the satellite's solar array and the sun.

Referring now to FIG. 3 there is shown the various vector and geometric relationships between the solar array and the sun. For the solar array configuration shown in FIG. 1, it is assumed that the spacecraft 10 has a solar array drive that maintains the $\hat{i}_s$, $\hat{i}_n$, and $\hat{k}'$ vectors designated respectively as 40, 42, 23 approximately coplanar, where $\hat{k}'$ is the a unit vector which is parallel to the spacecraft's pitch axis, $\hat{i}_s$ is the unit vector directed from the sun to the surface of the array and $\hat{i}_n$ is the unit vector normal to the array surface. The unit vectors $\hat{j}'$ and $\hat{i}'$ designated respectively as 44, 46 are vectors which are parallel to the spacecraft's roll 16 and yaw 14 axes, respectively. The significance of maintaining the vectors 40, 42, and 23 approximately coplanar is that an array geometry is defined such that the solar array faces the sun and the shaft of the solar array as seen in FIG. 1 is nominally parallel to the spacecraft's pitch axis. The angle between vectors $\hat{k}'$ and $\hat{i}_s$, $\gamma$, is the sun angle and the angle between $\hat{k}'$ and $\hat{i}_n$ is $\gamma_n$. There is also defined the angle $\beta_H$, where the angle $\beta_H$ has been defined previously as the orbit angle relative to the sun's projection in the orbit plane.

As is well known in the spacecraft art over the course of a year the sun angle $\gamma$ will vary over the range of 90° ± 23½°. At the vernal and autumnal equinoxes the sun line will be perpendicular to the spacecraft's solar array and the sun angle $\gamma$ will be 90°. Thus, at the equinoxes the slowly varying roll disturbance torques are a minimum as there is no component of solar pressure force in the plane of the array. At the summer and winter solstices, the sun angle $\gamma$ will be 90° ± 23½°. Thus, the slowly varying roll disturbance torques are a maximum as the maximum component of solar pressure force in the plane of the array occurs at the solstices. This change in sun angle between the solstices and the equinoxes is called the declination of the sun.

The solar pressure torque due to the displacement of the solar array from the center of mass of the spacecraft can then be determined, as is well known in the art, from the sun angle $\gamma$ and the angle $\beta_H$. This torque can be resolved into components along the yaw, roll, and pitch axes. The roll component $T_{ry}$ of this torque for asymmetrical parallel panels can be determined as:

$$\Sigma_i P_o A_{Pi} \cos(\gamma - \gamma_n)[(\alpha + \rho_d)(r_{Zi}\sin\gamma\cos\beta_H + r_{Xi}\cos\gamma) + 2[\rho_s\cos(\gamma - \gamma_n) + (\rho_d/3)](r_{Zi}\sin\gamma_n\cos\beta_H + r_{Xi}\cos\gamma_n)] \quad (1)$$

where $\gamma$ is the sun angle, $\gamma_n$ is the angle between the unit normal $\hat{i}_n$ to the panel and the vector $\hat{k}'$, $\beta_H$ is the orbit angle relative to the sun's projection in the orbit plane, $\alpha$ is the absorbtion coefficient of the solar array panels, $\rho_d$ is the coefficient of diffuse reflection of the solar array panels, $\rho_s$ is the coefficient of specular reflection of the solar array panels, $P_o$ is the radiation pressure characterizing the sun in the region of space occupied by the surface, $A_{pi}$ is the area of the surface of the $i$th solar array panel and $r_{Xi}$ and $r_{Zi}$ the displacement in the X and Z directions respectively of the center of pressure of the $i$th solar array panel from the center of mass of the spacecraft. For two balanced solar array panels ($r_{X1} = r_{X2} = r_X$, $r_{Z1} = -r_{Z2}$ and $A_{p1} = A_{p2} = A_P$) the expression for $T_{ry}$ can be reduced to the following expression:

$$= P_o A_P[(\alpha + \rho_d) r_X \cos\gamma + 2[\rho_s \cos(\gamma - \gamma_n) + (\rho_d/3)] r_X \cos\gamma_n]\cos(\gamma - \gamma_n) \quad (2)$$

It is seen from either of the above expressions (1) or (2), that the magnitude of the disturbance along the roll axis is a function of one variable, the sun angle $\gamma$. All the other parameters in equations (1) and (2) are virtual constants for a given spacecraft design. As stated previously for the case of the asymmetrical solar array, there will be solar pressure torque components along the X and Z axes in addition to the component along the Y axis. The Z axis and X axis solar pressure torque components can be counteracted by the techniques described previously.

Figure 4:
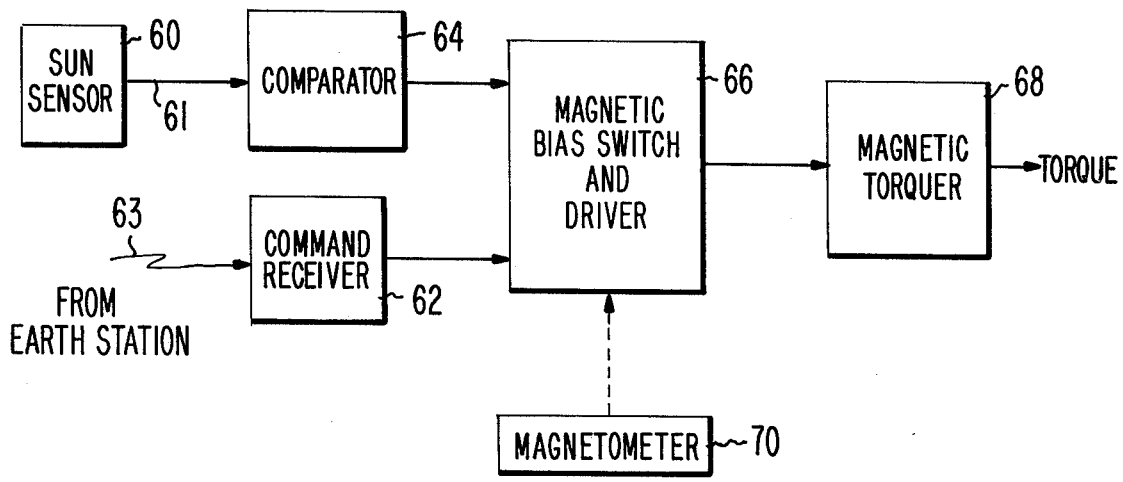
FIG. 4 is a block diagram of a magnetic control system illustrating one embodiment of the invention.

Referring to FIG. 4 there is shown a block diagram illustrating one embodiment of the invention. A command signal 63 to activate magnetic torquer 68 and produce a magnetic dipole of the required strength and direction is transmitted from an earth station, not shown, to command receiver 62. The earth station command signal 63 is a coded signal which based upon the known declination of the sun, represents the desired compensating magnetic dipole level. Command receiver 62 is any suitable prior art system which processes a received signal from an earth station and transmits the processed earth station signal to magnetic bias switch-and-driver 66.

Magnetic bias switch-and-driver 66 typically comprising either a current or voltage source and associated relays is suitably arranged to generate in response to the processed earth station signal from receiver 62, a signal determining appropriate current magnitude and polarity for magnetic torquer 68. A current source for driver 66 is preferred where magnetic torquer 68 is comprised of one or more of the so called air core coils. Thermal variations at the coil(s) produce changes in coil resistance which in turn produce changes in dipole magnetic dipole strength if the dipoles are driven by a voltage supply. Thus, the use of a current source for driver 66 overcomes the problems associated with thermal variations.

Magnetic torquer 68 can be implemented as shown in FIG. 6, to be described later either as a single coil, a combination of coils with suitable switches and associated circuitry to allow the selection of one or more of the coils comprising the combination, or an electromagnet. The output of switch 66 for a single coil or an electromagnet changes the amount and/or direction of current through the coil whereas for a combination of coils the output switch 66 would, in addition, select the various coils forming the combination to give the appropriate dipole magnetic field strength.

When magnetic torquer 68 is implemented as a combination of coils, the combination could, for example, comprise four coils, two of which have dual dipole levels and the other two of which are single dipole level coils. The dual coils have dipole strengths corresponding to the use of either half of or the whole coil. The single level coils produce a dipole equal in magnitude to the dipole produced when the whole of the dual level coil is used. One of the dual coils would serve as a backup to any other coil. Suitable circuitry may then be incorporated in magnetic torquer 68 to provide for proper coil selection and for use of the backup coil if necessary.

Torquer 68 in response to the output of switch-and-driver 66 developes a magnetic dipole of the required strength and direction. The reaction of this dipole with the earth's magnetic field causes a magnetic torque to be developed along the spacecraft's roll axis such that the yaw errors caused by the roll disturbance torques are compensated for. The strength and direction of the magnetic field developed by torquer 68 depends only upon one variable, namely, the sun angle γ. Thus, it is necessary for magnetic torquer 68 to be capable of assuming various field strength levels throughout a yearly cycle. This relationship between torquer field strength and sun angle shown in more detail in FIG. 5 will be described later.

In another embodiment, sun sensor 60 and comparator 64 replace the earth station command signal 63 and command receiver 62 of the embodiment described previously. Sun sensor 60 suitably mounted on the spacecraft generates a signal which indicates the declination of the sun. Sensor 60 may be implemented either in analog or digital form. The signal generated by sensor 60 is coupled by path 61 to comparator 64. Comparator 64, compare the signal generated by the sun sensor 60 to a switching characteristic such as that shown in FIG. 5. The switching characteristic represents as a function of the sun's declination, the magnetic dipole level which must be developed by torquer 68 so as to compensate for the predicted roll disturbance torques. Comparator 64 generates a signal which activates switch-and-driver 66 to thereby energize torquer 68 with current of appropriate magnitude and direction so as to develop the desired dipole level. The implementation of comparator 64 may be either in digital or analog form depending on the implementation of sensor 60.

In still another embodiment switch-and-driver 66 responds to signal inputs from both the combination of sensor 60 and comparator 64 and command receiver 62. In this embodiment, the signal input to switch-and-driver 66 from receiver 62 may be used for either of two purposes. One such purpose arises where from observations made at an earth station it is determined, for example, that sensor 60 is malfunctioning. Under such conditions the signal input from receiver 62 is used in place of the signal input from comparator 64. The other purpose arises where, from observations of the disturbances acting on the spacecraft made at an earth station, it is desired to recalibrate the dipole developed by torquer 68 as a function of the declination of the sun. For this condition the signal input from receiver 62 is used as a supplement to the signal input from comparator 64.

A magnetometer 70 may also be used in either of the embodiments described previously. Because of plasma emissions and magnetic substorms or noncircular orbits, the earth's magnetic field will experience certain fluctuations. To compensate for these fluctuations, magnetometer 70 is utilized to sense the local magnetic field strength at spacecraft 10 and adjust the dipole strength of magnetic torquer 68 through switch-and-driver 66 to maintain the desired level of compensation torque.

Figure 5:
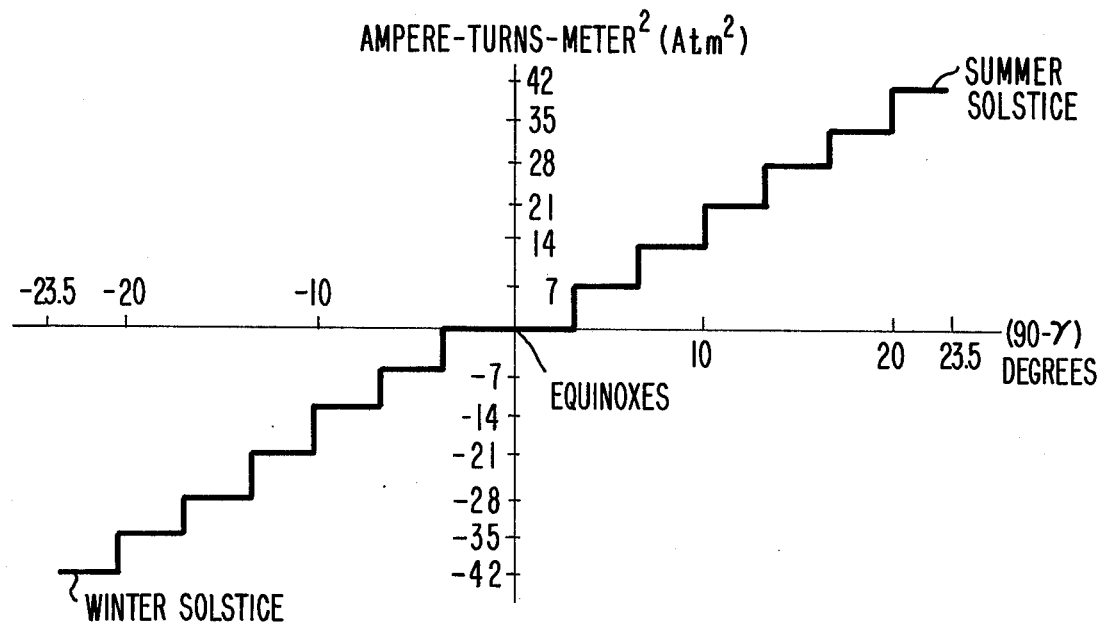
FIG. 5 is a characteristic of torquer magnetic field strength versus the declination of the sun.

Referring now to FIG. 5, there is shown a characteristic which represents the typical geosynchronous response of magnetic torquer 68 of FIG. 4 to the changing sun angle γ. As explained previously, at the autumnal and vernal equinoxes, there will be no component of force in the plane of the solar array. Thus, the output of magnetic torquer 68 at the time of the equinoxes should be a minimum. This is indicated by the center of the coordinates in FIG. 5. As the sun moves from its position at the equinoxes, the sun angle γ as explained previously will change such that an increasing force component is developed in the plane of the solar array. At the winter and summer solstices, the maximum component of force in the plane of the solar array will be developed. Thus, it is necessary for the output of magnetic torquer 68 to change in dipole strength as the sun moves from its position at the equinoxes to its position at the solstices. For a typical geosynchronous spacecraft, the changes in the dipole level developed by the magnetic torquer will be in steps of 7 ampere turns meter squared ($Atm^2$).

For the characteristic of FIG. 5, each step corresponds to a change in the strength of the dipole produced by magnetic torquer 68. This change occurs every two weeks on the average. For example, assuming the sun is initially at the vernal equinox, the dipole developed by magnetic torquer 68 is a minimum since there is no roll disturbance torque due to the sun at the vernal equinox. As the sun moves towards the summer solstice, signal inputs to switch-and-driver 66 are received from either comparator 64 or command receiver 62 approximately every 2 weeks to effect a change in dipole level of torquer 68. This change in signal input to switch-and-driver 66 can be represented by a step characteristic identical to the step characteristic of FIG. 5. The magnetic dipole strength of torquer 68 then increases by $7Atm^2$ for each step. Thus, at the summer solstice which is approximately 13 weeks after the vernal equinox, the field strength developed by torquer 68 will be at a maximum.

As the sun moves from its position at the summer solstice towards its position at the autumnal equinox, the dipole strength developed by magnetic torquer 68 decreases approximately every 2 weeks by $7Atm^2$. When the sun reaches the autumnal equinox, the dipole strength developed by magnetic torquer 68 will be a minimum as there is no roll disturbance torque at the autumnal equinox. As the sun moves from the autumnal equinox toward the winter solstice, the position of the sun relative to the solar array changes with respect to the position it had as it moved toward the summer solstice. Thus, it is necessary for the dipole developed by magnetic torquer 68 to reverse in direction. Approximately every 2 weeks as the sun moves from the autumnal equinox to the winter solstice, the dipole strength developed by magnetic torquer 68 will be increased by $7Atm^2$. At the winter solstice where there is maximum roll disturbance torque, the dipole strength developed by magnetic torquer 68 will be at a maximum. As the sun moves from the winter solstice towards the vernal equinox, the dipole strength developed by magnetic torquer 68 will be decreased approximately every 2 weeks by $7Atm^2$.

The characteristic of FIG. 5 has shown a change in magnetic torquer 68 dipole strength occurring approximately every 2 weeks. As is well known in the art, the steps representing the changes in field strength can either be made finer or coarser depending upon the granularity of torque compensation to be provided by magnetic torquer 68. For certain orbital conditions, it may be desirable for the changes in torquer field strength to occur continuously. For continuous magnetic torquing the characteristic of FIG. 5 would change from a step to a smooth curve fitted to the steps. The shape of this continuous torquing characteristic can be determined from either equation (1) for asymmetrical solar panels or equation (2) for balanced solar array panels. It should be also understood that the characteristic as shown in FIG. 5 with the summer solstice at the upper right hand corner and the winter solstice at the lower left hand corner is representative of the characteristic as it applies to the solar array geometry shown in FIG. 1. If the shaft of the solar array shown in FIG. 1 was located on the other side of the spacecraft's center of mass 20, the characteristic shown in FIG. 5 would be the same, except that the upper right hand corner would correspond to the winter solstice and the lower left hand corner would correspond to the summer solstice.

As explained previously, roll disturbance torques can also result from the gravity gradient and from residual spacecraft magnetic dipoles. The disturbance torques due to these effects are constant, but at very high altitudes such as geosynchronous, they are minimal when compared to the disturbance torque due to the offset of the solar array shaft from the spacecraft's center of mass. At lower altitudes, however, these effects become more severe and can eventually predominate. The disturbance torques due to the gravity gradient and residual spacecraft magnetic dipoles can be compensated for by shifting the characteristic of FIG. 5 vertically such that at the equinoxes instead of having a zero magnetic field developed by torquer 68 there will be developed by torquer 68 a constant magnetic field of the proper magnitude and direction. The amount of the vertical shift of FIG. 5 depends upon the strength of these constant gravity gradient and residual spacecraft magnetic dipole disturbance torques.

For the magnetic torquer comprising two dual strength coils, one acting as a backup to the other, in combination with two single strength coils, each step of the characteristic represents the selection of the proper coils. For a typical geosynchronous case, the dual strength coil is able to provide a magnetic dipole of either 7Atm$^2$ or 14Atm$^2$. These magnetic dipole strengths correspond to the use of either half of or the whole coil. The two single strength coils are each able to provide a magnetic field of 14Atm$^2$. The level command to magnetic bias switch 66 results in the selection of the proper coil or combination of coils to provide the required magnetic dipole for proper torquing. Suitable logic for selecting the coils would also be included in torquer 68. For example, disregarding the sign of the magnetic dipole and designating the coils as shown below, the operation of the coils is tabulated in Table I.

TABLE I

| TIME OF YEAR | Dual STRENGTH Atm$^2$ | SINGLE-A Atm$^2$ | SINGLE-B Atm$^2$ | TOTAL FIELD Atm$^2$ |
|---|---|---|---|---|
| Equinox (Vernal or Autumnal) | 0 | 0 | 0 | 0 |
| 1st step | 7 | 0 | 0 | 7 |
| 2nd step | 0 or 14 | 0 or 14 | 0 or 14 | 14 |
| 3rd step | 7 | 0 or 14 | 0 or 14 | 21 |
| 4th step | 0 or 14 | 0 or 14 | 0 or 14 | 28 |
| 5th step | 7 | 14 | 14 | 35 |
| 6th step (solstice summer or winter) | 14 | 14 | 14 | 42 |

The notation 0 or 14 Atm$^2$ for a coil in the above table indicates that any one of the coils shown either alone or in combination is sufficient to supply the required magnetic dipole strength. For example, at the 4th step where the total dipole strength developed by torquer 68 is 28 Atm$^2$, this could be provided by the combination of single-A and single-B or either single-A or single-B in combination with the dual strength coil.

Referring now to FIG. 6, there is shown the satellite 10 and its associated momentum wheel 72, magnetic torquing device 68a and sun sensor 60. As described previously, the axis about which momentum wheel 72 is rotated is parallel to the pitch axis 18. When spacecraft 10 is operating in its intended mission orientation, the total angular momentum vector $\bar{H}$ (21 of FIG. 1) is generated by momentum wheel 72.

Figure 7:
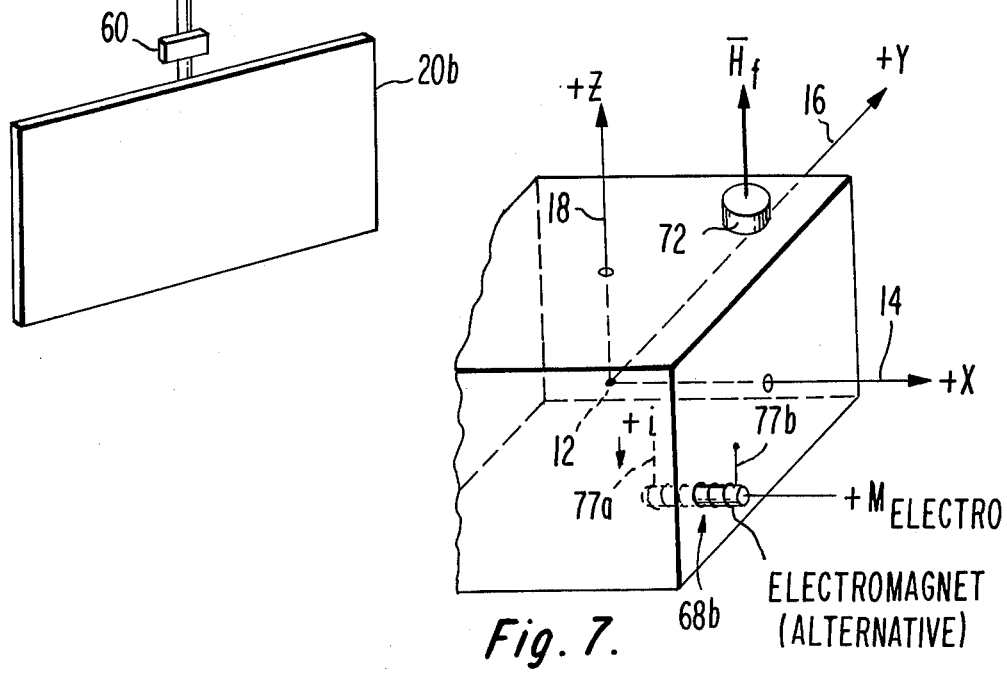
FIG. 7 is a fragmentary schematic diagram of the satellite of FIG. 6 showing an alternative embodiment of an electromagnet 68b as an alternative to the air core coil 68a shown in FIG. 6.

As described previously, magnetic torquer 68 of FIG. 4 may be implemented either as one or more "air" core coils 68a (FIG. 6) or as an electromagnet 68b shown in FIG. 7. Where magnetic torquer 68 is implemented as the combination of "air" core coils 68a, the coils are wound concentrically on the same assembly, one coil on top of another, only three coils being shown as indicated by the three sets of terminal ends 75a and 75b. The input terminals 75a and 75b of coil(s) 68a are suitably coupled to the current source of the switch-and-driver 66 of FIG. 4. The use of one or more of the "air" core coils 68a to develop either of two magnetic field strengths, explained above in conjunction with Table I, is accomplished by varying the current in the selected coil.

In the alternative embodiment using an electromagnet rather than an air coil, the input terminals 77a and 77b of electromagnet 68b (FIG. 7) are suitably coupled to switch-and-driver 66. The direction of current flow which develops the magnetic dipole substantially parallel to the yaw axis is indicated for the respective embodiments by the arrows on coil(s) 68a and electromagnet 68b.

What is claimed is:
1. A method for torquing a momentum biased spacecraft to compensate for predicted roll disturbance torques caused substantially by solar radiation pressure on the spacecraft to minimize the yaw rotational deviation of the pitch axis from a desired attitude parallel to the orbit normal, said pitch axis being collinear with the momentum vector of said spacecraft, comprising the steps of:
   a. sensing without sensing yaw errors, the declination of the sun by sensor means mounted on said spacecraft for generating in response to solar energy a signal representing the declination of the sun,
   b. generating in response to said sensor output signal a logic output signal by logic means coupled to said sensor means, said logic signal representing a desired magnetic dipole strength,
   c. generating in response to said logic output signal a signal for energizing magnetic torquing means by energizing means coupled to said logic means,
   d. magnetic torquing said spacecraft by energizing said torquing means to produce a magnetic dipole substantially parallel to the yaw axis of said spacecraft such that the magnetic field therefrom reacts with the magnetic field of the earth to produce a magnetic torque substantially of equal magnitude and opposite direction to said predicted roll disturbance torques to thereby minimize the deviation of said pitch axis.

2. A method according to claim 1 wherein said energizing means includes at least one current source and said torquing means comprises at least one air core coil.

3. A method according to claim 2 wherein said spacecraft is of the dual-spin type having a momentum wheel, and wherein said torquing means comprises first, second, and third air core coils, said first coil being energized by said current source to develop either of two magnetic field strengths, said second and third coils being energized by said current source to develop a magnetic field equal in strength to the maximum field developed by said first coil.

4. A method according to claim 1 wherein said energizing means includes a magnetometer for sensing the magnetic field of the earth, and including a step for generating a signal from said magnetometer for energizing said magnetic torquing means to compensate said torquing means for deviations in the magnetic field of the earth.

5. A method according to claim 1 wherein said torquing means is an electromagnet.

6. A method according to claim 1 further including the steps of receiving signals transmitted to said spacecraft and generating in response thereto a receiver output signal, said energizing means in response to said receiver output signal energizing said magnetic torquing means.

7. A torquing system for a momentum bias spacecraft to compensate for predicted roll disturbance torques and thereby minimize the yaw rotational deviation of the pitch axis from a desired attitude parallel to the orbit normal, said spacecraft being of the dual-spin type having a momentum wheel, said pitch axis being collinear with the momentum vector of said spacecraft, comprising:
   a. magnetic torquing means oriented in said spacecraft to produce when energized a magnetic dipole substantially parallel to the yaw axis of said satellite,
   b. sensor means mounted on said spacecraft for generating in response to solar energy a signal representing the declination of the sun,
   c. logic means coupled to said sensor means for generating in response to said sensor output signal a logic output signal, said logic signal representing a desired magnetic dipole strength; and
   d. energizing means coupled to said logic means for generating in response to said logic output signal signals for energizing said magnetic torquing means such that the magnetic field therefrom reacts with the magnetic field of the earth to produce a magnetic torque substantially of equal magnitude and opposite direction to said roll disturbance torques to thereby minimize the deviation of said pitch axis,
   said torquing means comprising first, second, and third air core coils, said first coil being energized to develop either of two magnetic field strengths, said second and third coils being energized to develop a magnetic field equal in strength to the maximum magnetic field developed by said first coil.

8. A system according to claim 7 wherein said energizing means includes a magnetometer for sensing the magnetic field of the earth, and further including means for generating a signal from said magnetometer for energizing said magnetic torquing means to compensate said torquing means for deviations in the magnetic field of the earth.

9. A system according to claim 7 further including receiver means coupled to said energizing means for receiving signals transmitted to said spacecraft and generating in response thereto a receiver means output signal, said energizing means in response to said receiver output signal energizing said magnetic torquing means.

10. A torquing system for a momentum biased spacecraft at synchronous orbit to compensate for predicted roll disturbance torques due to solar disturbance torques to thereby minimize the yaw rotational deviation of the pitch axis from a desired attitude parallel to the orbit normal caused by such solar disturbance torques without sensing yaw errors, said pitch axis being collinear with the momentum vector of said spacecraft, comprising:
   a. magnetic torquing means oriented in said spacecraft to produce when energized a magnetic dipole substantially parallel to the yaw axis of said spacecraft,
   b. sensor means mounted on said spacecraft for generating in response to solar energy a signal representing the declination of the sun without representing yaw deviations,
   c. logic means coupled to said sensor means for generating in response to said sensor output signal a logic output signal, said logic signal representing a desired magnetic dipole strength, and
   d. energizing means coupled to said logic means for generating in response to said logic output signal a signal for energizing said magnetic torquing means such that the magnetic field therefrom reacts with the magnetic field of the earth to produce a magnetic torque substantially of equal magnitude and opposite direction to said predicted roll disturbance torques to thereby minimize the deviation of said pitch axis,
   e. whereby yaw rotational deviations of a synchronous orbiting spacecraft due solely to solar disturbance torques are compensated without sensing yaw errors of said spacecraft.

11. A system according to claim 10 wherein said energizing means includes at least one current source and said torquing means comprises at least one air core coil.

12. A system according to claim 11 wherein said satellite is of the dual-spin type having a momentum wheel, and said torquing means comprises first, second, and third air core coils, said first coil being energized by said current source to develop either of two magnetic field strengths, said second and third coils being energized by said current source to develop a magnetic field equal in strength to the maximum magnetic field developed by said first coil.

13. A system according to claim 10 wherein said energizing means includes a magnetometer for sensing the magnetic field of the earth, including means for generating a signal from said magnetometer for energizing said magnetic torquing means to compensate said torquing means for deviations in the magnetic field of the earth.

14. A system according to claim 10 wherein said torquing means is an electromagnet.

15. A system according to claim 10 further including receiver means coupled to said energizing means for receiving signals transmitted to said spacecraft and generating in response thereto a receiver means output signal, said energizing means in response to said receiver output signal energizing said magnetic torquing means.

* * * * *